US008826265B2

(12) United States Patent
Vedantham et al.

(10) Patent No.: US 8,826,265 B2
(45) Date of Patent: Sep. 2, 2014

(54) DATA CONCENTRATOR INITIATED MULTICAST FIRMWARE UPGRADE

(71) Applicant: Texas Instruments Incorporated, Dallas, TX (US)

(72) Inventors: Ramanuja Vedantham, Allen, TX (US); Kumaran Vijayasankar, Dallas, TX (US); Ramachandran Ananthakrishnan, Richardson, TX (US); Susan Yim, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 24 days.

(21) Appl. No.: 13/659,866

(22) Filed: Oct. 24, 2012

(65) Prior Publication Data

US 2013/0104117 A1   Apr. 25, 2013

Related U.S. Application Data

(60) Provisional application No. 61/550,523, filed on Oct. 24, 2011, provisional application No. 61/578,028, filed on Dec. 20, 2011.

(51) Int. Cl.
*G06F 9/44* (2006.01)
*G06F 9/445* (2006.01)
*H04B 3/54* (2006.01)

(52) U.S. Cl.
CPC ........ *G06F 8/665* (2013.01); *H04B 2203/5408* (2013.01); *H04B 3/542* (2013.01)
USPC ............................ 717/172; 717/170; 717/177

(58) Field of Classification Search
CPC ............... G06F 8/65; G06F 8/71; G06F 8/61; G06F 8/60; G06F 8/67; H04L 29/08981
See application file for complete search history.

(56) References Cited

U.S. PATENT DOCUMENTS

| | | | | |
|---|---|---|---|---|
| 7,111,050 | B2* | 9/2006 | McAdams | 717/172 |
| 7,350,205 | B2* | 3/2008 | Ji | 717/172 |
| 7,356,577 | B2* | 4/2008 | Collins | 717/172 |
| 7,421,688 | B1* | 9/2008 | Righi et al. | 717/172 |
| 7,626,489 | B2* | 12/2009 | Berkman et al. | 340/12.32 |

(Continued)

OTHER PUBLICATIONS

Kang et al., "Design and Implementation of Network Management System for Power Line Communication Network", 2007 IEEE, ISPLC 2007, Mar. 26-28, 2007, pp. 23-28; <http://ieeexplore.ieee.org/stamp/stamp.jsp?tp=&arnumber=4231666>.*

(Continued)

*Primary Examiner* — Thuy Dao
*Assistant Examiner* — Ben C Wang
(74) *Attorney, Agent, or Firm* — Steven A. Shaw; Frederick J. Telecky, Jr.

(57) ABSTRACT

Systems and methods for implementing data concentrated initiated multicast firmware upgrade in power line communications (PLC) are described. In an illustrative embodiment, a method performed by a PLC device may include forming a group of PLC devices to receive a transmission of a data set, the group being organized according to a hierarchical structure, transmitting the data set to the group of PLC devices, determining whether a PLC device in the lowest level of the hierarchical structure is missing one or more portions of the data set, and retransmitting at least the missing portions of the data set until the lowest level of PLC devices each have the full data set.

16 Claims, 6 Drawing Sheets

(56) References Cited

U.S. PATENT DOCUMENTS

| | | | |
|---|---|---|---|
| 7,673,301 B1* | 3/2010 | Righi et al. | 717/172 |
| 7,738,612 B2* | 6/2010 | Rafaeli | 375/354 |
| 7,761,866 B2* | 7/2010 | Abe et al. | 717/172 |
| 7,802,242 B2* | 9/2010 | Hase | 717/170 |
| 7,826,398 B2* | 11/2010 | Monier | 370/255 |
| 7,844,964 B2* | 11/2010 | Marolia | 717/172 |
| 7,849,454 B2* | 12/2010 | Lambert et al. | 717/170 |
| 8,024,723 B2* | 9/2011 | Nahm et al. | 717/172 |
| 8,024,724 B2* | 9/2011 | Stuber et al. | 717/172 |
| 8,209,677 B2* | 6/2012 | Shintani et al. | 717/177 |
| 8,520,676 B2* | 8/2013 | Shaffer et al. | 370/390 |
| 2003/0031175 A1* | 2/2003 | Hayashi et al. | 370/390 |
| 2004/0015572 A1* | 1/2004 | Kang | 709/220 |
| 2007/0115973 A1* | 5/2007 | Koga et al. | 370/389 |
| 2008/0052702 A1* | 2/2008 | Chuang | 717/170 |
| 2008/0075009 A1* | 3/2008 | Picard | 370/238 |
| 2008/0183307 A1* | 7/2008 | Clayton et al. | 700/8 |
| 2008/0183316 A1* | 7/2008 | Clayton | 700/90 |
| 2008/0295091 A1* | 11/2008 | Shintani et al. | 717/172 |
| 2009/0278706 A1* | 11/2009 | Giubbini | 340/870.02 |
| 2010/0102987 A1* | 4/2010 | Lou et al. | 340/870.02 |
| 2010/0169876 A1* | 7/2010 | Mann | 717/170 |
| 2011/0107322 A1* | 5/2011 | Hashiguchi | 717/170 |
| 2011/0179408 A1* | 7/2011 | Nakamura | 717/170 |
| 2011/0191764 A1* | 8/2011 | Piorecki | 717/172 |
| 2012/0060151 A1* | 3/2012 | Oh et al. | 717/172 |
| 2012/0072896 A1* | 3/2012 | Watanabe et al. | 717/170 |
| 2012/0076211 A1* | 3/2012 | Varadarajan et al. | 375/257 |
| 2012/0079473 A1* | 3/2012 | Watanabe et al. | 717/170 |
| 2012/0093198 A1* | 4/2012 | Dabak et al. | 375/139 |
| 2012/0134395 A1* | 5/2012 | Varadarajan et al. | 375/220 |
| 2012/0182881 A1* | 7/2012 | Ananthakrishnan et al. | 370/244 |
| 2013/0016758 A1* | 1/2013 | Hui et al. | 375/134 |
| 2013/0022084 A1* | 1/2013 | Vasseur et al. | 375/134 |
| 2013/0031253 A1* | 1/2013 | Hui et al. | 709/225 |
| 2013/0093601 A1* | 4/2013 | Ree | 340/870.02 |
| 2013/0094597 A1* | 4/2013 | Vijayasankar et al. | 375/257 |
| 2013/0121335 A1* | 5/2013 | Hui et al. | 370/390 |
| 2013/0184879 A1* | 7/2013 | Xia et al. | 700/286 |
| 2013/0188673 A1* | 7/2013 | Sun et al. | 375/219 |
| 2013/0194975 A1* | 8/2013 | Vedantham et al. | 370/255 |
| 2013/0215885 A1* | 8/2013 | Vijayasankar et al. | 370/389 |
| 2013/0266081 A1* | 10/2013 | Pande et al. | 375/257 |
| 2013/0301649 A1* | 11/2013 | Vijayasankar et al. | 370/445 |
| 2013/0314249 A1* | 11/2013 | Le Buhan et al. | 340/870.02 |
| 2013/0315057 A1* | 11/2013 | Popa et al. | 370/228 |
| 2013/0336414 A1* | 12/2013 | Burk | 375/257 |
| 2014/0109076 A1* | 4/2014 | Boone et al. | 717/170 |

OTHER PUBLICATIONS

Francesco Trentini, "Power Line Communications: An Implementation of A Real Time Control Architecture for SMART Grid", Apr. 17, 2012, University of Padua, pp. 1-105; <tesi.cab.unipd.it/39774/1/tesi.pd>.*

Tudor et al., "Analysis of the Impact of Data Granularity of Privacy for the Smart Grid", 2013 ACM, WPES'13, Nov. 4-8, 2013, pp. 61-70; <http://dl.acm.org/citation.cfm?doid=2517840.2517844>.*

A. Sanz et al. "PRIME from the definition to a SoC solution", IEEE International Symposium on Power Line Communications and Its Appications. 2009 (ISPLC 2009), Dresden, Mar. 29, 2009-Apr. 1, 2009 (2009. 5. 8. (c)2009 IEEE) See abstract, pp. 347-352.

Stefano Galli et al. "The Inter-PHY Protocol (IPP): A Simple Coexistence Protocol for Shared Media", IEEE International Symposium on Power Line Communications and Its Appications, 2009 (ISPLC 2009), Dresden, Mar. 29, 2009-Apr. 1, 2009 (2009. 5. 8. (c)2009 IEEE). See abstract, pp. 194-199.

Akihito Suzuki et al. "Study on the coexistence of two types of PLCs in HF Band", Consumer Electronics, 2009 (ICCE '09), Digest of Technical Papers International Conference, Las Vegas, NV, Jan. 10-14, 2009 (2009. 5. 29. (c) 2009 IEEE); See P-3-8 abstract and part I-part VI.

M.K. Lee et al. "Home Plug 1.0 powerline communication LANs-protocol description and performance results", Published online May 15, 2003, Copyright #2003, John Wiley & Sons, Ltd, See summary, pp. 449-460.

\* cited by examiner

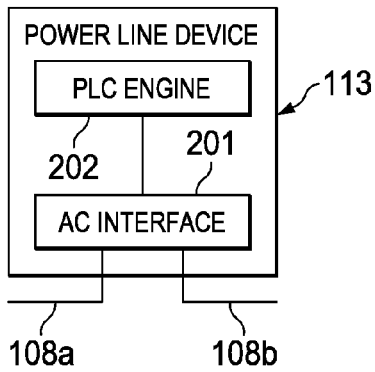
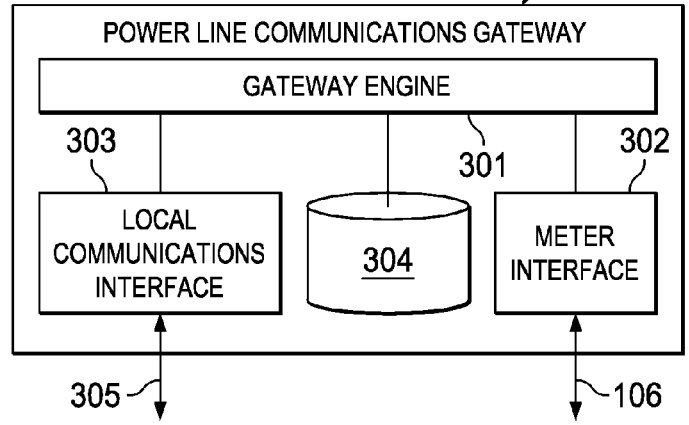
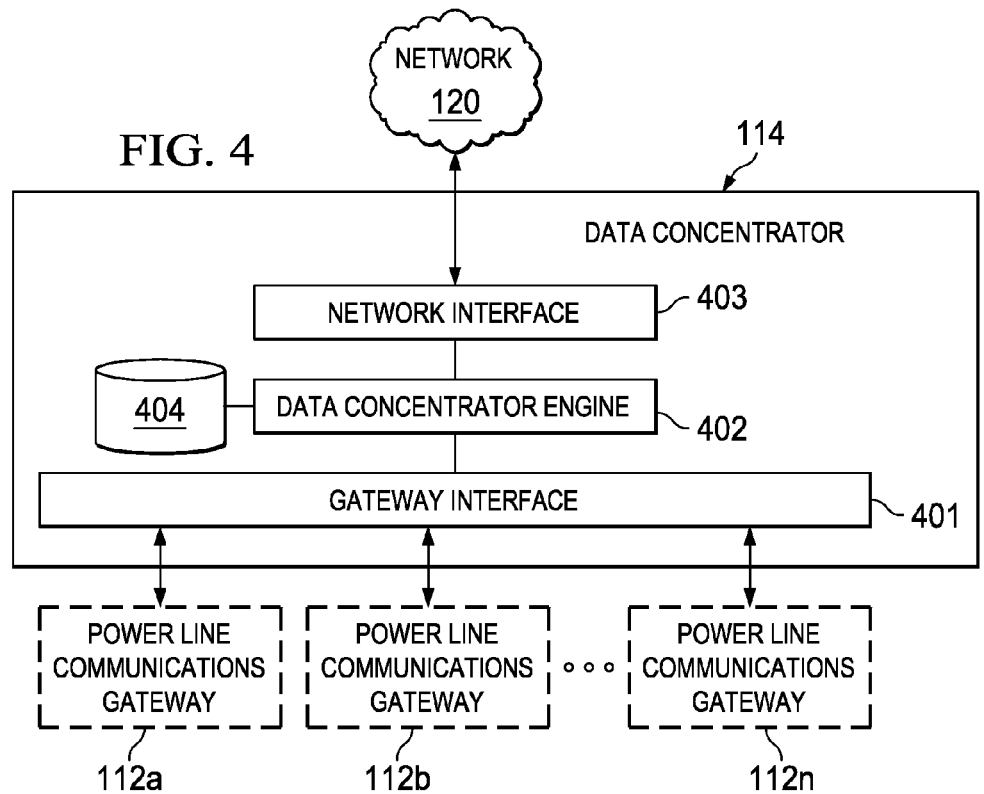

DATA CONCENTRATOR INITIATED MULTICAST FIRMWARE UPGRADE

CROSS-REFERENCE TO RELATED APPLICATIONS

This application claims the benefit of the filing date of U.S. Provisional Patent Application No. 61/578,028, which is titled "Data Concentrator Initiated Multicast firmware Upgrade Algorithm in PRIME" and was filed on Dec. 20, 2011, the disclosure of which is hereby incorporated by reference herein in its entirety. This application also claims the benefit of the filing date of U.S. Provisional Patent Application No. 61/550,523, which is titled "Methods for Firmware Upgrade and Sequence Number Matching" and was filed on Nov. 24, 2011, the disclosure of which is hereby incorporated by reference herein in its entirety.

BACKGROUND

Power line communications (PLC) include systems for communicating data over the same medium that is also used to transmit electric power to residences, buildings, and other premises, such as wires, power lines, or other conductors. In its simplest terms, PLC modulates communication signals over existing power lines. This enables devices to be networked without introducing any new wires or cables. This capability is extremely attractive across a diverse range of applications that can leverage greater intelligence and efficiency through networking. PLC applications include utility meters, home area networks, lighting, and solar.

Using PLC to communicate with utility meters enable applications such as Automated Meter Reading (AMR) and Automated Meter Infrastructure (AMI) communications without the need to install additional wires. Consumers may also use PLC to connect home electric meters to an energy monitoring device or in-home display monitor their energy consumption and to leverage lower-cost electric pricing based on time-of-day demand.

As the home area network expands to include controlling home appliances for more efficient consumption of energy, OEMs may use PLC to link these devices and the home network. PLC may also support home and industrial automation by integrating intelligence into a wide variety of lighting products to enable functionality such as remote control of lighting, automated activation and deactivation of lights, monitoring of usage to accurately calculate energy costs, and connectivity to the grid.

PLC may also serve as an important enabling technology for the mass deployment of solar equipment by providing a communication channel to solar inverters for monitoring and managing power across the grid by utility companies. While radio frequency (RF) communications have made some progress in solar installations, PLC offers an ideal means for connecting equipment with high reliability and at a low cost on DC or AC lines.

PLC is a generic term for any technology that uses power lines as a communications channel. Various PLC standardization efforts are currently in work around the world. The different standards focus on different performance factors and issues relating to particular applications and operating environments. Two of the most well-known PLC standards are G3 and PRIME. G3 has been approved by the International Telecommunication Union (ITU). IEEE is developing the IEEE P1901.2 standard that is based on G3. Each PLC standard has its own unique characteristics. PRIME is designed for low voltage lines with low noise and targets higher data rates. On the other hand, G3 is designed for medium voltage lines and targets lower data rates.

As systems develop, it may be helpful for a system administrator to be able to push a firmware upgrade to devices in the PLC system. In situations where there are many devices on a network and where minimal network interruptions are desired, it may be helpful to push the firmware upgrades using a multicast scheme.

SUMMARY

Systems and methods for implementing data concentrated initiated multicast firmware upgrade in power line communications (PLC) are described. In an illustrative embodiment, a method performed by a PLC device may include forming a group of PLC devices to receive a transmission of a data set, the group being organized according to a hierarchical structure, transmitting the data set to the group of PLC devices, determining whether a PLC device in the lowest level of the hierarchical structure is missing one or more portions of the data set, and retransmitting at least the missing portions of the data set until the lowest level of PLC devices each have the full data set.

In a further embodiment, the method may include determining, one level at a time, whether a PLC device in each preceding level of the hierarchical structure is missing one or more portions of the data set, and retransmitting, one level at a time, at least the missing portions of the data set until the each preceding level of PLC devices each has the full data set.

Additionally, the method may include transmitting a command to flash each PLC device in the group on a level-by-level basis, starting with the devices in the lowest level of the hierarchy, until each PLC device in the group has completed a flash operation.

In one embodiment, the method may include ensuring that each PLC device in a network is in an IDLE state. The method may also include forming the group of PLC devices further comprises sending a unicast invitation to each PLC device for joining a multicast group to receive the data set.

In one embodiment, the data set is a firmware upgrade file. The method may further include defining a sequence number in a firmware upgrade control frame configured for use in the firmware upgrade. Also, the method may include receiving a firmware upgrade control responses comprising the sequence number as defined in the upgrade control frame such that the firmware upgrade response frame may be match with the firmware upgrade control frame. In still a further embodiment, the method may include determining whether the firmware upgrade control response matches the firmware upgrade control frame. In another embodiment, the method may include sending the firmware control frame in unicast to a PLC device in the group.

A power line communication (PLC) device is also presented in accordance with the embodiments described above. In one embodiment, the PLC device includes a processor and a memory coupled to the processor. The memory may be configured to store program instructions executable by the processor to cause the PLC device to form a group of PLC devices to receive a transmission of a data set, the group being organized according to a hierarchical structure, transmit the data set to the group of PLC devices, determine whether a PLC device in the lowest level of the hierarchical structure is missing one or more portions of the data set, and retransmit at least the missing portions of the data set until the lowest level of PLC devices each have the full data set.

In some embodiments, one or more of the methods described herein may be performed by one or more PLC devices (e.g., a PLC meter, PLC data concentrator, etc.). In other embodiments, a tangible electronic storage medium may have program instructions stored thereon that, upon execution by a processor within one or more PLC devices, cause the one or more PLC devices to perform one or more operations disclosed herein. Examples of such a processor include, but are not limited to, a digital signal processor (DSP), an application specific integrated circuit (ASIC), a system-on-chip (SoC) circuit, a field-programmable gate array (FPGA), a microprocessor, or a microcontroller. In yet other embodiments, a PLC device may include at least one processor and a memory coupled to the at least one processor, the memory configured to store program instructions executable by the at least one processor to cause the PLC device to perform one or more operations disclosed herein.

BRIEF DESCRIPTION OF THE DRAWINGS

Figure 1:
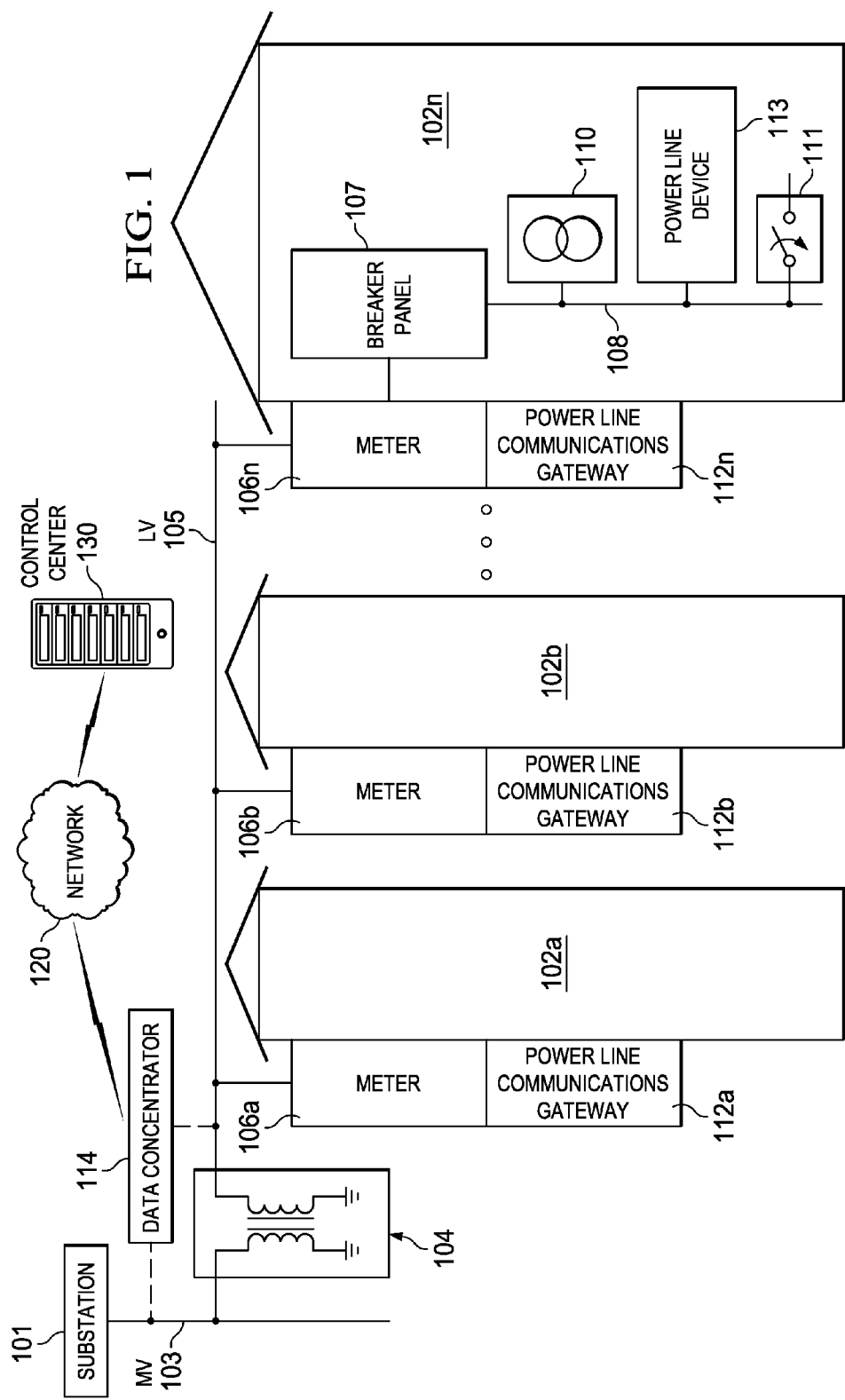

Having thus described the invention(s) in general terms, reference will now be made to the accompanying drawings, wherein:

FIG. 1 is a diagram of a PLC system according to some embodiments.

FIG. 2 is a block diagram of a PLC device or modem according to some embodiments.

FIG. 3 is a block diagram of a PLC gateway according to some embodiments.

FIG. 4 is a block diagram of a PLC data concentrator according to some embodiments.

Figure 5:
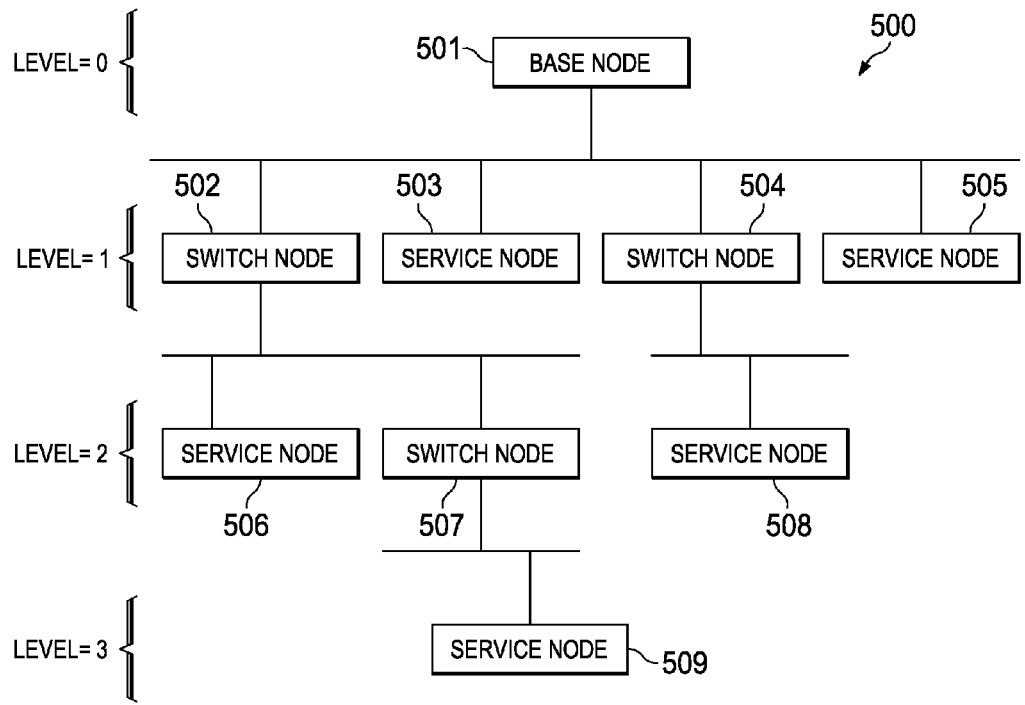

FIG. 5 is a block diagram illustrating one embodiment of a hierarchical PLC network.

Figure 6B:
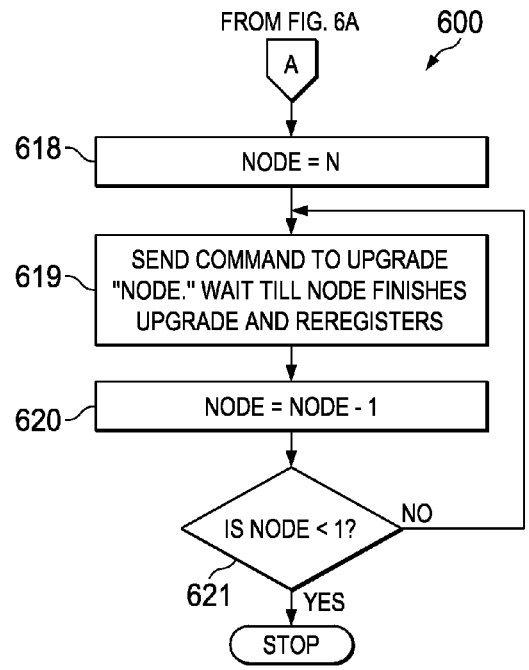
Figure 6A:
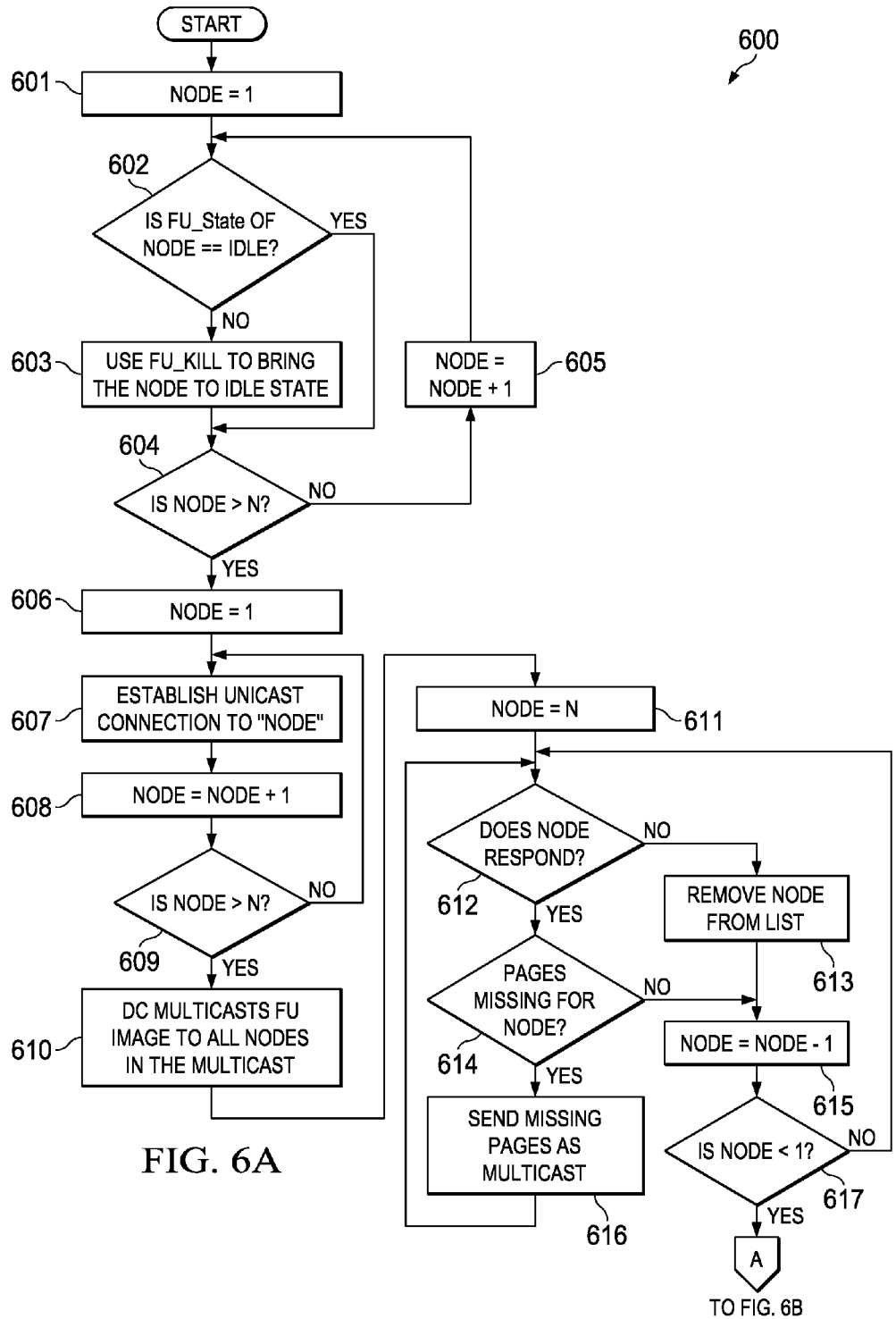

FIGS. 6A-B illustrates one embodiment of a method for data concentrator initiated multicast firmware upgrade.

Figure 7:
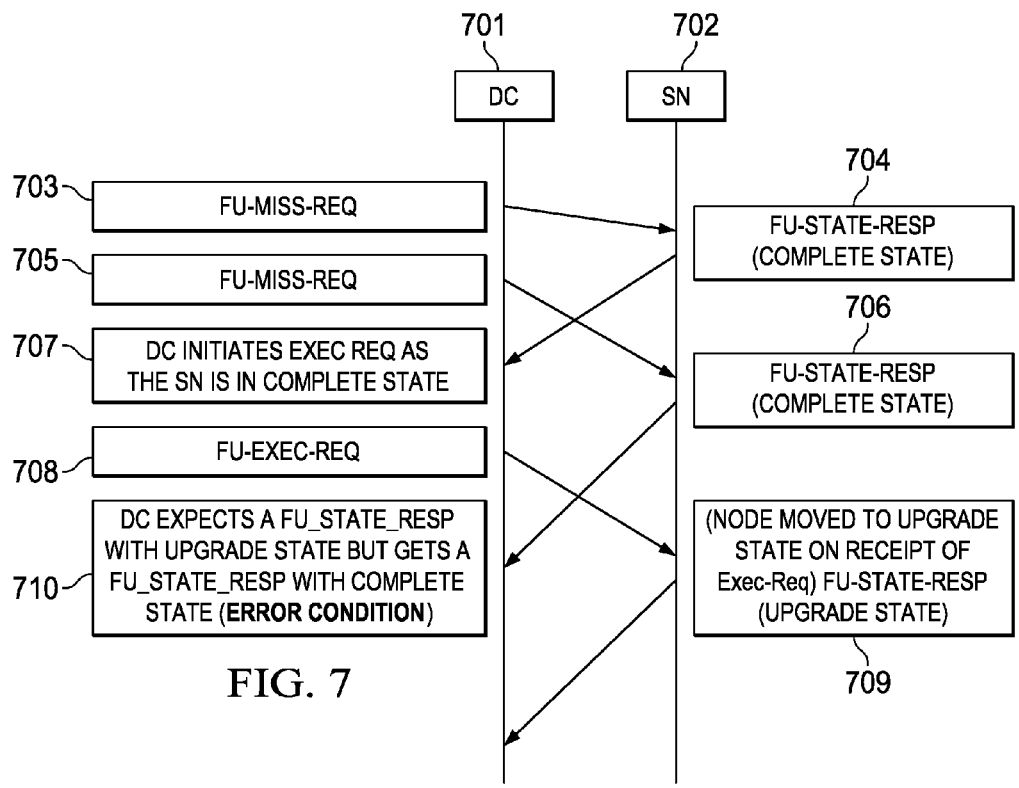

FIG. 7 illustrates one embodiment of a scenario for firmware upgrade in which an error may occur.

Figure 8:
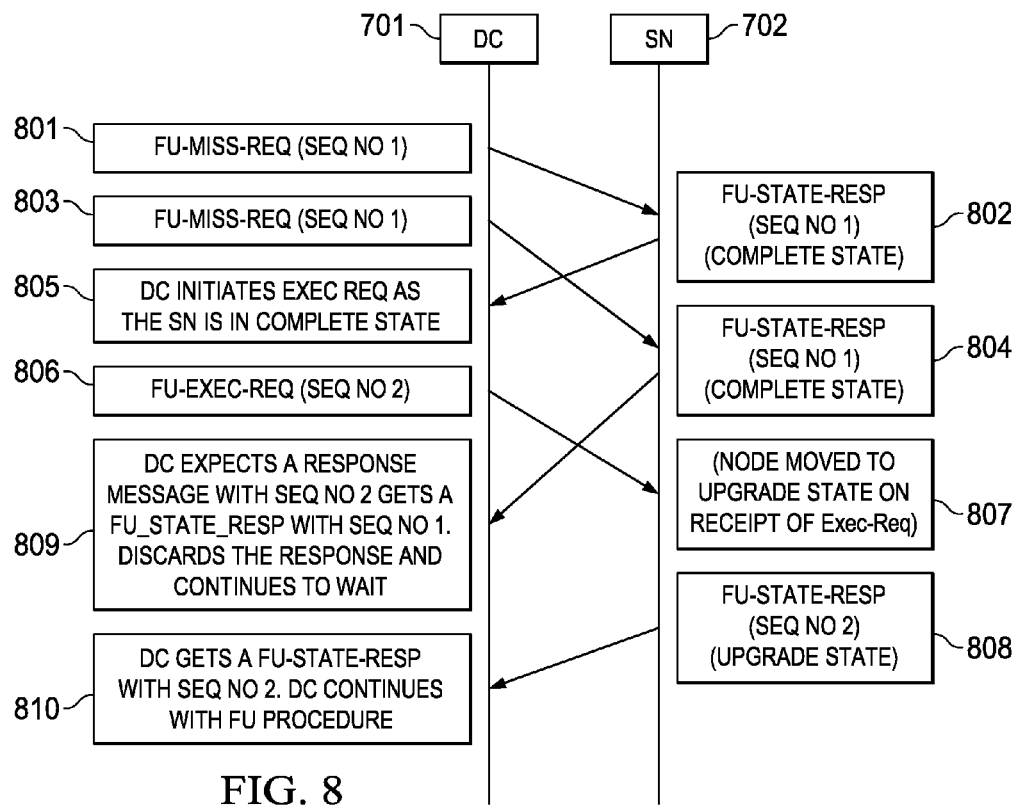

FIG. 8 illustrates one embodiment of a method for data concentrator initiated multicast firmware upgrade in which the errors described in FIG. 7 are avoided.

Figure 9:
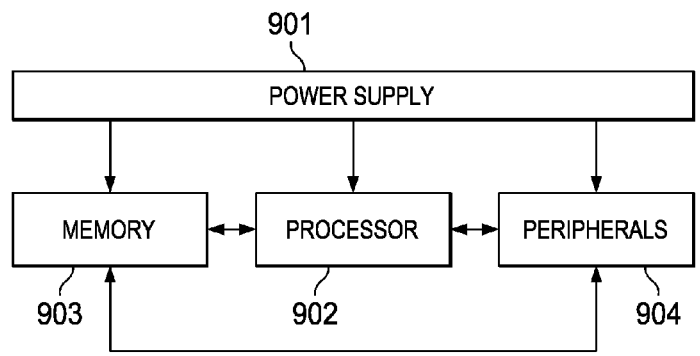

FIG. 9 is a block diagram of an integrated circuit according to some embodiments.

DETAILED DESCRIPTION

The invention(s) now will be described more fully hereinafter with reference to the accompanying drawings. The invention(s) may, however, be embodied in many different forms and should not be construed as limited to the embodiments set forth herein. Rather, these embodiments are provided so that this disclosure will be thorough and complete, and will fully convey the scope of the invention(s) to a person of ordinary skill in the art. A person of ordinary skill in the art may be able to use the various embodiments of the invention(s).

FIG. 1 illustrates a power line communication (PLC) system according to some embodiments. Medium voltage (MV) power lines 103 from substation 101 typically carry voltage in the tens of kilovolts range. Transformer 104 steps the MV power down to low voltage (LV) power on LV lines 105, carrying voltage in the range of 100-240 VAC. Transformer 104 is typically designed to operate at very low frequencies in the range of 50-60 Hz. Transformer 104 does not typically allow high frequencies, such as signals greater than 100 KHz, to pass between LV lines 105 and MV lines 103. LV lines 105 feed power to customers via meters 106a-n, which are typically mounted on the outside of residences 102a-n. Although referred to as "residences," premises 102a-n may include any type of building, facility, electric vehicle charging station, or other location where electric power is received and/or consumed. A breaker panel, such as panel 107, provides an interface between meter 106n and electrical wires 108 within residence 102n. Electrical wires 108 deliver power to outlets 110, switches 111 and other electric devices within residence 102n.

The power line topology illustrated in FIG. 1 may be used to deliver high-speed communications to residences 102a-n. In some implementations, power line communications modems or gateways 112a-n may be coupled to LV power lines 105 at meter 106a-n. PLC modems/gateways 112a-n may be used to transmit and receive data signals over MV/LV lines 103/105. Such data signals may be used to support metering and power delivery applications (e.g., smart grid applications), communication systems, high speed Internet, telephony, video conferencing, and video delivery, to name a few. By transporting telecommunications and/or data signals over a power transmission network, there is no need to install new cabling to each subscriber 102a-n. Thus, by using existing electricity distribution systems to carry data signals, significant cost savings are possible.

An illustrative method for transmitting data over power lines may use a carrier signal having a frequency different from that of the power signal. The carrier signal may be modulated by the data, for example, using an OFDM technology or the like described, for example, by the PRIME, G3 or IEEE 1901 standards.

PLC modems or gateways 112a-n at residences 102a-n use the MV/LV power grid to carry data signals to and from PLC data concentrator or router 114 without requiring additional wiring. Concentrator 114 may be coupled to either MV line 103 or LV line 105. Modems or gateways 112a-n may support applications such as high-speed broadband Internet links, narrowband control applications, low bandwidth data collection applications, or the like. In a home environment, for example, modems or gateways 112a-n may further enable home and building automation in heat and air conditioning, lighting, and security. Also, PLC modems or gateways 112a-n may enable AC or DC charging of electric vehicles and other appliances. An example of an AC or DC charger is illustrated as PLC device 113. Outside the premises, power line communication networks may provide street lighting control and remote power meter data collection.

One or more PLC data concentrators or routers 114 may be coupled to control center 130 (e.g., a utility company) via network 120. Network 120 may include, for example, an IP-based network, the Internet, a cellular network, a WiFi network, a WiMax network, or the like. As such, control center 130 may be configured to collect power consumption and other types of relevant information from gateway(s) 112 and/or device(s) 113 through concentrator(s) 114. Additionally or alternatively, control center 130 may be configured to implement smart grid policies and other regulatory or commercial rules by communicating such rules to each gateway(s) 112 and/or device(s) 113 through concentrator(s) 114.

FIG. 2 is a block diagram of PLC device 113 according to some embodiments. As illustrated, AC interface 201 may be coupled to electrical wires 108a and 108b inside of premises 112n in a manner that allows PLC device 113 to switch the connection between wires 108a and 108b off using a switching circuit or the like. In other embodiments, however, AC interface 201 may be connected to a single wire 108 (i.e., without breaking wire 108 into wires 108a and 108b) and without providing such switching capabilities. In operation, AC interface 201 may allow PLC engine 202 to receive and transmit PLC signals over wires 108a-b. In some cases, PLC device 113 may be a PLC modem. Additionally or alternatively, PLC device 113 may be a part of a smart grid device (e.g., an AC or DC charger, a meter, etc.), an appliance, or a control module for other electrical elements located inside or outside of premises 112n (e.g., street lighting, etc.).

PLC engine 202 may be configured to transmit and/or receive PLC signals over wires 108a and/or 108b via AC interface 201 using a particular frequency band. In some embodiments, PLC engine 202 may be configured to transmit OFDM signals, although other types of modulation schemes may be used. As such, PLC engine 202 may include or otherwise be configured to communicate with metrology or monitoring circuits (not shown) that are in turn configured to measure power consumption characteristics of certain devices or appliances via wires 108, 108a, and/or 108b. PLC engine 202 may receive such power consumption information, encode it as one or more PLC signals, and transmit it over wires 108, 108a, and/or 108b to higher-level PLC devices (e.g., PLC gateways 112n, data aggregators 114, etc.) for further processing. Conversely, PLC engine 202 may receive instructions and/or other information from such higher-level PLC devices encoded in PLC signals, for example, to allow PLC engine 202 to select a particular frequency band in which to operate.

FIG. 3 is a block diagram of PLC gateway 112 according to some embodiments. As illustrated in this example, gateway engine 301 is coupled to meter interface 302, local communication interface 304, and frequency band usage database 304. Meter interface 302 is coupled to meter 106, and local communication interface 304 is coupled to one or more of a variety of PLC devices such as, for example, PLC device 113. Local communication interface 304 may provide a variety of communication protocols such as, for example, ZIGBEE, BLUETOOTH, WI-FI, WI-MAX, ETHERNET, etc., which may enable gateway 112 to communicate with a wide variety of different devices and appliances. In operation, gateway engine 301 may be configured to collect communications from PLC device 113 and/or other devices, as well as meter 106, and serve as an interface between these various devices and PLC data concentrator 114. Gateway engine 301 may also be configured to allocate frequency bands to specific devices and/or to provide information to such devices that enable them to self-assign their own operating frequencies.

In some embodiments, PLC gateway 112 may be disposed within or near premises 102n and serve as a gateway to all PLC communications to and/or from premises 102n. In other embodiments, however, PLC gateway 112 may be absent and PLC devices 113 (as well as meter 106n and/or other appliances) may communicate directly with PLC data concentrator 114. When PLC gateway 112 is present, it may include database 304 with records of frequency bands currently used, for example, by various PLC devices 113 within premises 102n. An example of such a record may include, for instance, device identification information (e.g., serial number, device ID, etc.), application profile, device class, and/or currently allocated frequency band. As such, gateway engine 301 may use database 304 in assigning, allocating, or otherwise managing frequency bands assigned to its various PLC devices.

FIG. 4 is a block diagram of PLC data concentrator or router 114 according to some embodiments. Gateway interface 401 is coupled to data concentrator engine 402 and may be configured to communicate with one or more PLC gateways 112a-n. Network interface 403 is also coupled to data concentrator engine 402 and may be configured to communicate with network 120. In operation, data concentrator engine 402 may be used to collect information and data from multiple gateways 112a-n before forwarding the data to control center 130. In cases where PLC gateways 112a-n are absent, gateway interface 401 may be replaced with a meter and/or device interface (now shown) configured to communicate directly with meters 116a-n, PLC devices 113, and/or other appliances. Further, if PLC gateways 112a-n are absent, frequency usage database 404 may be configured to store records similar to those described above with respect to database 304.

Network elements that communicate using the PRIME standard may be arranged in subnetworks. A subnetwork has a single base node and one or more services nodes that branch from the base node in one or more levels. The base node acts as a master node and provides the subnetwork with connectivity. The base node manages the subnetwork resources and connections. The base node is initially the only node in the subnetwork and other nodes follow a registration process to enroll on the subnetwork.

Service nodes may operate in one of three functional states: disconnected, terminal, or switch. Service nodes start in a disconnected state during which the node is not capable of communicating or switching the traffic of another node. In the disconnected state, a service node searches for an operational network and attempts to register on the network. In the terminal state, a service node is capable of communicating its traffic, but it is not capable of switching traffic for any other node. In the switch state, a service node is capable of performing all terminal functions and is capable of forwarding data to and from other devices on the subnetwork.

Each service node has a level in the subnetwork topology. The nodes that are connected directly to the base node have level 1. The level of any service node not directly connected to the base node is the level of its respective switch node plus one.

FIG. 5 illustrates a subnetwork 500 according to an example embodiment. Base node 501 is connected to nodes 502-505, which are on level 1 in the subnetwork. Nodes 502 and 504 have been promoted to switch node, and nodes 503 and 505 operate as service nodes. Nodes 506 and 507 are on level 2 of the subnetwork and connect through switch node 502. Node 508 is also on level 2 and is connected through switch node 504. Node 507 has been promoted to switch node and provides a connection to service node 509, which is on level 3 of the subnetwork.

Multicast and broadcast addresses are used for transmitting data information within subnetwork 500. There are several broadcast and multicast address types, depending on the context associated with the traffic flow. A broadcast identifier is used as a destination address for packets that should reach every node of the subnetwork. A multicast identifier is used as a destination address for multicast groups. A unicast address refers to a particular node within the subnetwork with an identifier that match the address fields in the unicast address.

In one embodiment, the method of FIGS. 6A-B may be carried out by one or more of the devices in the subnetwork 500 of FIG. 5. For example, the base node 501 may be configured to perform the operations described herein. In a further embodiment, data concentrator 114 may be configured as a base node 501. In particular, the data concentrator 114 may be configured according to a PRIME standard. In one embodiment, the method 600 may include performing a multicast firmware upgrade initiated by the data concentrator 114. The method 600 may reduce the state maintenance at the base node 501 during a firmware upgrade, while also incurring low overhead in the network 500.

In one embodiment, the base node 501 verifies the state of each node 502-509 that it wants to upgrade through unicast state request transmissions. If all nodes are IDLE, then the process continues. Otherwise if the states are not in IDLE, then the base node 501 may send a unicast abort (Kill) message to change the state of the nodes 502-509 to IDLE state. The base node 501 may then send a unicast invite to each node 502-509 for joining the multicast group to perform the firmware upgrade.

Once the nodes 502-509 join the multicast group, the base node 501 transmits one round of all pages in a firmware upgrade by multicast to each of the nodes 502-509. After completing the first round of multicast firmware upgrade, the base node 501 polls the last level node to check on all the missing page requests. In the depicted embodiment, the last level node may be node 509 in level 3. If, on the other hand, there are several nodes belonging to the last level, the node may be chosen randomly among the last level nodes. In one embodiment, the list of all missing pages for node 509 may be compiled before responding with any retries.

The base node 501 then performs the second round of multicast firmware upgrade of all missing pages corresponding to the last level node 509. This may be repeated until all pages have been recovered for the last level node 509. If the node 509 is dead for any reason, the base node 501 will have a timer to move on to the next node 507 and the node 509 is removed from the firmware upgrade list. The base node 501 may repeatedly identify missing pages and retransmit all missing pages for all nodes 502-509 in the list that have missing pages starting from the farthest node 509 first. This is because the nodes that are further away from base node 501 are likely to have more missing pages than the node closer to the base node 501 and accounting for their losses should enable other nodes to recover from their losses.

After all nodes 502-509 receive all pages of the new firmware, the base node 501 may send a command to flash the last level node 509. Again, if there are several nodes belonging to the last level, the node may be chosen randomly. The base node 501 waits for this node to complete its firmware upgrade process fully and re-register before moving on to the next node 507. Note that this will allow the base node 501 to remove all the nodes that have upgraded their firmware from the firmware upgrade list. The base node 501 may repeat the flash command for each node (one-by-one) starting from the farthest level node 509. In an alternative embodiment, a top-down flash process may also be performed.

In still another embodiment, the base node 501 may be configured to send the flash command to all nodes on a given level. For example, once node 509 completes the flash, the base node 509 may send a command to each of nodes 506-608 so that they may perform the flash process substantially simultaneously. In still another embodiment, all nodes 502-509 may be flashed starting at a common reference point of time. Such embodiments may balance the flashing time required for all nodes in large scale networks for the stability of the newly formed network after the firmware upgrade process. Additionally, the flash process may increases the congestion/traffic in the network 500 to different degrees (level-by-level may create more traffic compared to one-by-one flashing, whereas all node flashing will incur substantially more overhead compared the other methods).

FIGS. 6A-B illustrate one embodiment of a process 600 for performing the firmware upgrade. In this embodiment, the values 1, 2, ... N represent the nodes in the multicast firmware upgrade list in the increasing order of levels in the network. Nodes in the same level are represented using consecutive numbers.

In one embodiment, the process 600 may start by selecting a first node (N=1) in the node list at block 601. The base node 501 may then determine whether the state of Node 1 is IDLE or not at block 602. If Node 1 is not IDLE, then the base node 501 may issue a FU_Kill command to bring Node 1 into IDLE state at block 603. At block 604, it may be determined whether a node value in the node list is greater than N, where N is the total number of nodes on the list. If not, then the Next node may be selected at block 605 until all nodes on the node list are set to IDLE state.

Next, at block 606, Node 1 is selected again. The base node 501 may then establish a unicast connection to Node 1 at block 607 and this may be repeated until a unicast connection is established with each node in the network as illustrated at blocks 608 and 609. The base node may then multicast transmit all pages of the firmware upgrade to all nodes in the multicast at block 610. The last node on the list (Node N) may then be selected at block 611.

In one embodiment, Node N may be the farthest level node (e.g., node 509 in FIG. 5). Then, the base node 501 may determine whether the node responds at block 612. If the node is unresponsive, it is removed from the list at block 613 and the node value is reduced by one, thereby selecting the preceding node on the list at block 615. A further determination is made of whether any pages are missing for the node at block 614. If not, then the node value is advanced at block 615. If so, then the base node 501 may send the missing pages as a multicast transmission at block 616. Advantageously, other nodes in the network will have another opportunity to obtain these pages because the multicast transmission of the missing pages will be sent to all nodes between the base node 501 and the current node (Node N). This process may repeat until Node N has received all of the pages of the firmware upgrade. Once all pages are received, the node value is advanced at block 618 unless the node value is <1 as determined at block 617. Once this process has been completed for all nodes, then the base node 501 may send commands to upgrade the nodes at block 619 and wait until each node finishes the upgrade and reregisters. This upgrade and reregistration process at block 619 is repeated for all nodes as shown in blocks 620-621.

The firmware upgrade protocol in PRIME does not provide for a way to match the requests with responses in communications between nodes in the network. The Prime standard relies on an assumption that a wait time between messages is sufficient to ensure a request-response matching. Unfortunately, this assumption may be false in certain situations. For example, FIG. 7 illustrates a scenario where a delayed frame delivery from the service node (SN) 702 to Data Concentrator (DC) 701 occurs.

In this situation, the data concentrator 701 assumes that the FU-STATE-RESP received at block 710 with a complete state indication is actually a response at block 706 for the FU-EXEC-REQ that it had sent earlier at block 708. There is no mechanism at the data concentrator 701 side to determine whether the response 706 was indeed generated for its last sent request 708. In reality, under the current scenario, the data concentrator 701 may actually receive the FU-STATE-RESP sent at block 706, but would be expecting the FU-STATE-RESP which is not sent until block 709. In such an embodiment, errors may occur.

For example, the data concentrator 701 may send a FU-MISS-REQ at block 703 to the SN 702. At block 704, the SN 702 may send an FU-STATE-RESP back to the data concentrator 701. Data concentrator 701 may send a second FU-MISS-REQ command at block 705 and SN 702 may respond in kind with an FU-STATE-RESP command at block 706. In the meantime, the data concentrator 701 may initiate an Exec Req at the SN in the complete state at block 707 in response to the first FU-STATE-RESP command sent at block 704. The data concentrator may then issue an FU-EXEC-REQ at block 708. After the FU-EXEC-REQ is sent at block 708, the data concentrator 701 may receive the second FU-STATE-RESP sent at block 706. Unfortunately, the data concentrator may expect an FU-STATE-RESP with "Upgrade State," which isn't sent by SN 702 until block 709, but instead gets an FU-STATE-RESP with "complete State," which may cause an error.

In one embodiment, the mismatch described in FIG. 7 may be resolved by adding a sequence number to the FU control packets as shown in FIG. 8. For example, the sequence number may be a one byte value added to the second byte of the FU control packets. This sequence number may be linearly incremented and wrapped around if necessary for every new FU control packet that is sent a request. Retransmitted FU control frames may also include the same sequence number. Every FU control response message (from SN 702) will carry the same sequence number as that of the FU request message. Thus at the data concentrator 701 side, the response message can be mapped to the actual request message to determine whether a response is for the expected request message. At the SN 702 side the same response will be provided for the request message with the same sequence number (retransmitted request messages). One embodiment of this such a method is described in FIG. 8. The use of sequence number helps the DC 701 to differentiate the response and helps prevents the DC 701 from reaching the error condition.

For example, in this embodiment, the data concentrator 701 may send a FU-MISS-REQ with a sequence No. '1' assigned at block 801 to the SN 702. At block 802, the SN 702 may send an FU-STATE-RESP with "Complete State" and sequence No. '1' assigned back to the data concentrator 701. Data concentrator 701 may send a second FU-MISS-REQ command with sequence No. 1 assigned at block 803 and SN 702 may respond in kind with an FU-STATE-RESP command with "Complete State" and sequence No. 1 assigned at block 804. In the meantime, the data concentrator 701 may initiate an Exec Req at the SN in the complete state at block 805 in response to the first FU-STATE-RESP command sent at block 802, just as in the scenario described in FIG. 7. The data concentrator 701 may then issue an FU-EXEC-REQ at block 806. After the FU-EXEC-REQ is sent at block 806, the data concentrator 701 may receive the second FU-STATE-RESP sent at block 804. Fortunately, because of the difference in sequence number between the commands, the data concentrator 701 may be configured to distinguish between the "Complete State" response and the "Upgrade State" response (block 808), and an error may be avoided as shown in block 809. Accordingly, the data concentrator 701 may continue with the firmware upgrade procedure uninterrupted as shown at block 810.

To maintain backward compatibility, the DC may not use the sequence number field if it is known that the SN 702 supports an older version of firmware. The DC 701 may first send a FU_STATE_REQ with version=0. If the SN 702 supports the version no 1, it will respond with a FU_STATE_RESP with version=1 with no sequence number field. The DC 701 will then use the version number 1 for the firmware upgrade messages. If however the SN 702 responds with a FU_STATE_RESP with version number 0, the DC will continue to perform firmware upgrade with version=0 for that node. It should be noted that even during the multicast firmware upgrade, all FU control messages may be sent as unicast and hence service nodes supporting different version numbers may be supported simultaneously.

Accordingly, certain embodiments help ensure proper matching of the request and response messages. Such embodiments may also help avoid error condition in FU state machine caused due to delayed responses. Embodiments may also be backward compatible with existing FU procedure.

FIG. 9 is a block diagram of a circuit for implementing data concentrator initiated multicast firmware upgrade according to some embodiments. In some cases, one or more of the devices and/or apparatuses shown in FIGS. 1-4 may be implemented as shown in FIG. 9. In some embodiments, processor 902 may be a digital signal processor (DSP), an application specific integrated circuit (ASIC), a system-on-chip (SoC) circuit, a field-programmable gate array (FPGA), a microprocessor, a microcontroller, or the like. Processor 902 is coupled to one or more peripherals 904 and external memory 903. In some cases, external memory 903 may be used to store and/or maintain databases 304 and/or 404 shown in FIGS. 3 and 4. Further, processor 902 may include a driver for communicating signals to external memory 903 and another driver for communicating signals to peripherals 904. Power supply 901 provides supply voltages to processor 02 as well as one or more supply voltages to memory 903 and/or peripherals 904. In some embodiments, more than one instance of processor 902 may be included (and more than one external memory 903 may be included as well).

Peripherals 904 may include any desired circuitry, depending on the type of PLC system. For example, in an embodiment, peripherals 904 may implement local communication interface 303 and include devices for various types of wireless communication, such as WI-FI, ZIGBEE, BLUETOOTH, cellular, global positioning system, etc. Peripherals 904 may also include additional storage, including RAM storage, solid-state storage, or disk storage. In some cases, peripherals 904 may include user interface devices such as a display screen, including touch display screens or multi-touch display screens, keyboard or other input devices, microphones, speakers, etc.

External memory 903 may include any type of memory. For example, external memory 903 may include SRAM, non-volatile RAM (NVRAM, such as "flash" memory), and/or dynamic RAM (DRAM) such as synchronous DRAM (SDRAM), double data rate (DDR, DDR2, DDR3, etc.) SDRAM, DRAM, etc. External memory 903 may include one or more memory modules to which the memory devices are mounted, such as single inline memory modules (SIMMs), dual inline memory modules (DIMMs), etc.

It will be understood that in various embodiments, the modules shown in FIGS. 2-4 may represent sets of software routines, logic functions, and/or data structures that are configured to perform specified operations. Although these modules are shown as distinct logical blocks, in other embodiments at least some of the operations performed by these modules may be combined in to fewer blocks. Conversely, any given one of the modules shown in FIGS. 2-4 may be implemented such that its operations are divided among two or more logical blocks. Moreover, although shown with a particular configuration, in other embodiments these various modules may be rearranged in other suitable ways.

Many of the operations described herein may be implemented in hardware, software, and/or firmware, and/or any combination thereof. When implemented in software, code segments perform the necessary tasks or operations. The program or code segments may be stored in a processor-readable, computer-readable, or machine-readable medium. The processor-readable, computer-readable, or machine-readable medium may include any device or medium that can store or transfer information. Examples of such a processor-readable medium include an electronic circuit, a semiconductor memory device, a flash memory, a ROM, an erasable ROM (EROM), a floppy diskette, a compact disk, an optical disk, a hard disk, a fiber optic medium, etc.

Software code segments may be stored in any volatile or non-volatile storage device, such as a hard drive, flash memory, solid state memory, optical disk, CD, DVD, computer program product, or other memory device, that provides tangible computer-readable or machine-readable storage for a processor or a middleware container service. In other embodiments, the memory may be a virtualization of several physical storage devices, wherein the physical storage devices are of the same or different kinds. The code segments may be downloaded or transferred from storage to a processor or container via an internal bus, another computer network, such as the Internet or an intranet, or via other wired or wireless networks.

Many modifications and other embodiments of the invention(s) will come to mind to one skilled in the art to which the invention(s) pertain having the benefit of the teachings presented in the foregoing descriptions, and the associated drawings. Therefore, it is to be understood that the invention(s) are not to be limited to the specific embodiments disclosed. Although specific terms are employed herein, they are used in a generic and descriptive sense only and not for purposes of limitation.

The invention claimed is:

1. A method comprising:
performing, by a power line communication (PLC) device,
 forming a group of PLC devices to receive a transmission of a data set, the group being organized according to a hierarchical structure;
 transmitting the data set to the group of PLC devices using PLC;
 determining whether a PLC device in a lowest level of the hierarchical structure is missing one or more portions of the data set;
 retransmitting, using PLC, at least the missing portions of the data set until each PLC device in the lowest level group of PLC devices have the full data set;
 determining, one level at a time, whether a PLC device in each of a preceding level of the hierarchical structure is missing one or more portions of the data set;
 retransmitting, using PLC one level at a time, at least the missing portions of the data set until the each PLC device in the preceding level of the PLC devices has the full data set;
 transmitting, using PLC, a command to flash each PLC device in the group on a level-by-level basis, starting with the devices in the lowest level of the hierarchy, until each PLC device in the group has completed a flash operation; and
 wherein the hierarchical structure has at least two levels.

2. The method of claim 1, further comprising ensuring that each PLC device in a network is in an IDLE state.

3. The method of claim 1, wherein forming the group of PLC devices further comprises sending, using PLC, a unicast invitation to each PLC device for joining a multicast group to receive the data set.

4. The method of claim 1, wherein the data set is a firmware upgrade file.

5. The method of claim 4, further comprising defining a sequence number in a firmware upgrade control frame configured for use in the firmware upgrade.

6. The method of claim 5, further comprising receiving, using PLC, a firmware upgrade control responses comprising the sequence number as defined in the upgrade control frame such that the firmware upgrade response frame may be match with the firmware upgrade control frame.

7. The method of claim 6, further comprising determining whether the firmware upgrade control response matches the firmware upgrade control frame.

8. The method of claim 5, further comprising sending the firmware control frame in unicast to a PLC device in the group, using PLC.

9. A power line communication (PLC) device, comprising:
a processor; and
a memory coupled to the processor, the memory configured to store program instructions executable by the processor to cause the PLC device to:
 form a group of PLC devices to receive a transmission of a data set, the group being organized according to a hierarchical structure;
 transmit the data set to the group of PLC devices using PLC;
 determine whether a PLC device in a lowest level of the hierarchical structure is missing one or more portions of the data set;
 retransmit, using PLC, at least the missing portions of the data set until each PLC device in the lowest level group of PLC devices have the full data set;
 determine, one level at a time, whether a PLC device in a preceding level of the hierarchical structure is missing one or more portions of the data set;
 retransmit, using PLC one level at a time, at least the missing portions of the data set until each PLC device in the preceding level of the PLC devices has the full data set; and
 transmit, using PLC, a command to flash each PLC device in the group on a level-by-level basis, starting with the devices in the lowest level of the hierarchy, until each PLC device in the group has completed a flash operation; and
wherein the hierarchical structure has at least two levels.

10. The PLC device of claim 9, further configured to ensure that each PLC device in a network is in an IDLE state.

11. The PLC device of claim 9, further configured to send, using PLC, a unicast invitation to each PLC device for joining a multicast group to receive the data set.

12. The PLC device of claim 9, wherein the data set is a firmware upgrade file.

13. The PLC device of claim 12, further configured to define a sequence number in a firmware upgrade control frame configured for use in the firmware upgrade.

14. The PLC device of claim 13, further configured to receive, using PLC, a firmware upgrade control responses comprising the sequence number as defined in the upgrade control frame such that the firmware upgrade response frame may be match with the firmware upgrade control frame.

15. The PLC device of claim 14, further configured to determine whether the firmware upgrade control response matches the firmware upgrade control frame.

16. The PLC device of claim 13, further configured to send the firmware control frame in unicast to a PLC device in the group.

* * * * *